United States Patent
Ogasahara (10) Patent No.: US 9,392,261 B2
(45) Date of Patent: Jul. 12, 2016

(54) IMAGE PROCESSING APPARATUS, IMAGE PROCESSING METHOD, AND CAMERA MODULE FOR FRAME TIMING ADJUSTMENT

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 845 days.

(21) Appl. No.: 13/361,031

(22) Filed: Jan. 30, 2012

(65) Prior Publication Data

US 2012/0242804 A1 Sep. 27, 2012

(30) Foreign Application Priority Data

Mar. 23, 2011 (JP) ................................. 2011-064555

(51) Int. Cl.
*H04N 13/02* (2006.01)
*H04N 13/00* (2006.01)

(52) U.S. Cl.
CPC ....... *H04N 13/0239* (2013.01); *H04N 13/0029* (2013.01)

(58) Field of Classification Search
CPC ...................... H04N 13/0239; H04N 13/0029
USPC .......................................... 348/42, 43, 47, 56
See application file for complete search history.

(56) References Cited

U.S. PATENT DOCUMENTS

| | | | | |
|---|---|---|---|---|
| 4,583,117 A | * | 4/1986 | Lipton | H04N 13/0438 348/207.99 |
| 5,084,763 A | * | 1/1992 | Naradate et al. | 348/51 |
| 5,140,415 A | * | 8/1992 | Choquet | H04N 13/0014 348/46 |
| 5,745,185 A | * | 4/1998 | Portron | H04N 5/0736 348/512 |
| 6,008,839 A | * | 12/1999 | Nagele | H04N 13/0003 348/47 |
| 6,396,946 B1 | * | 5/2002 | Sogawa | 382/154 |
| 6,518,939 B1 | * | 2/2003 | Kikuchi | 345/8 |
| 7,956,886 B2 | * | 6/2011 | Murayama | 348/42 |
| 8,718,463 B2 | * | 5/2014 | Kamiya et al. | 396/325 |
| 8,830,301 B2 | * | 9/2014 | Jang | 348/43 |
| 2003/0112507 A1 | * | 6/2003 | Divelbiss et al. | 359/464 |
| 2005/0280702 A1 | | 12/2005 | Nakano et al. | |
| 2007/0085903 A1 | * | 4/2007 | Zhang | 348/58 |
| 2008/0143829 A1 | * | 6/2008 | Takeda | 348/143 |
| 2009/0322858 A1 | * | 12/2009 | Mitsuya | H04N 7/0132 348/43 |

(Continued)

FOREIGN PATENT DOCUMENTS

JP 62-10971 A 1/1987
JP 401245693 A * 3/1988

(Continued)

OTHER PUBLICATIONS

Japanese Office Action issued Dec. 2, 2014, in Japan Patent Application No. 2011-064555 (with English translation).

(Continued)

*Primary Examiner* — David Harvey
(74) *Attorney, Agent, or Firm* — Oblon, McClelland, Maier & Neustadt, L.L.P (57) ABSTRACT

According to one embodiment, an image processing apparatus includes an image capturing unit and a timing adjustment unit. The image capturing unit captures a first image and a second image. The timing adjustment unit adjusts the frame timing of the first image and the frame timing of the second image captured to the image capturing unit. The timing adjustment unit makes an adjustment for delaying the frame timing of the second image to the frame timing of the first image possible.

3 Claims, 6 Drawing Sheets

(56) References Cited

U.S. PATENT DOCUMENTS

| | | | |
|---|---|---|---|
| 2010/0039428 A1* | 2/2010 | Kim et al. .................... 345/419 |
| 2010/0277567 A1 | 11/2010 | Takizuka et al. |
| 2011/0157318 A1* | 6/2011 | Nalibotski ......... H04N 13/0048 |
| | | | 348/47 |
| 2011/0249098 A1* | 10/2011 | Chiba et al. .................... 348/47 |

FOREIGN PATENT DOCUMENTS

| | | | |
|---|---|---|---|
| JP | 401165293 A * | 6/1989 |
| JP | 401171387 A * | 7/1989 |
| JP | 02013094 A * | 1/1990 |
| JP | 5-137054 A | 6/1993 |
| JP | 6-133339 | 5/1994 |
| JP | 7-254073 | 10/1995 |
| JP | 8-205202 | 8/1996 |
| JP | 409168169 A * | 6/1997 |
| JP | 2006-5608 | 1/2006 |
| JP | 2006-128842 | 5/2006 |
| JP | 2007-60129 | 3/2007 |
| JP | 2008-61259 A | 3/2008 |
| JP | 2010-263382 | 11/2010 |
| WO | WO 93/08665 * | 4/1993 |

OTHER PUBLICATIONS

Office Action issued Mar. 11, 2014 in Japanese Patent Application No. 2011-064555 (with English language translation).

Office Action issued Jul. 30, 2013 in Japanese Patent Application No. 2011-064555 (with English translation).

* cited by examiner

IMAGE PROCESSING APPARATUS, IMAGE PROCESSING METHOD, AND CAMERA MODULE FOR FRAME TIMING ADJUSTMENT

CROSS-REFERENCE TO RELATED APPLICATIONS

This application is based upon and claims the benefit of priority from Japanese Patent Application No. 2011-064555, filed on Mar. 23, 2011; the entire contents of all of which are incorporated herein by reference.

FIELD

Embodiments described herein relate generally to an image processing apparatus, an image processing method, and a camera module.

BACKGROUND

Conventionally, there is known a camera module for picking up a left eye image and a right eye image separately by, for example, two sub-camera modules each having an image pick-up optical system and an image sensor as a camera module for picking up a 3D (three-dimensionally viewed) image. When a moving image is picked up, a camera module obtains image data for displaying a left eye image and a right eye image provided with a parallax each other in parallel by synchronizing the frame of a left eye image and the frame of a left eye image.

When a left eye image and a right eye image are alternately reproduced as in an active shutter system which is an ordinary display system of a 3D (three-dimensionally viewed) image, a delay may be felt slightly in a display at a relatively slow frame rate. To reduce unnaturalness of an image due to the delay of display, a conventional technology has a problem that a frame rate higher than that when an ordinary plan-viewed image is displayed is necessary.

DETAILED DESCRIPTION

In general, according to one embodiment, an image processing apparatus includes an image capturing unit and a timing adjustment unit. The image capturing unit captures a first image and a second image. The first image is picked up by a first sub-camera module. The second image is picked up by a second sub-camera module. The timing adjustment unit adjusts the frame timing of the first image and the frame timing of the second image captured to the image capturing unit. The timing adjustment unit makes an adjustment for delaying the frame timing of the second image to the frame timing of the first image possible.

Exemplary embodiments of an image processing apparatus, an image processing method, and a camera module will be explained below in detail with reference to the accompanying drawings. The present invention is not limited to the following embodiments.

Figure 1:
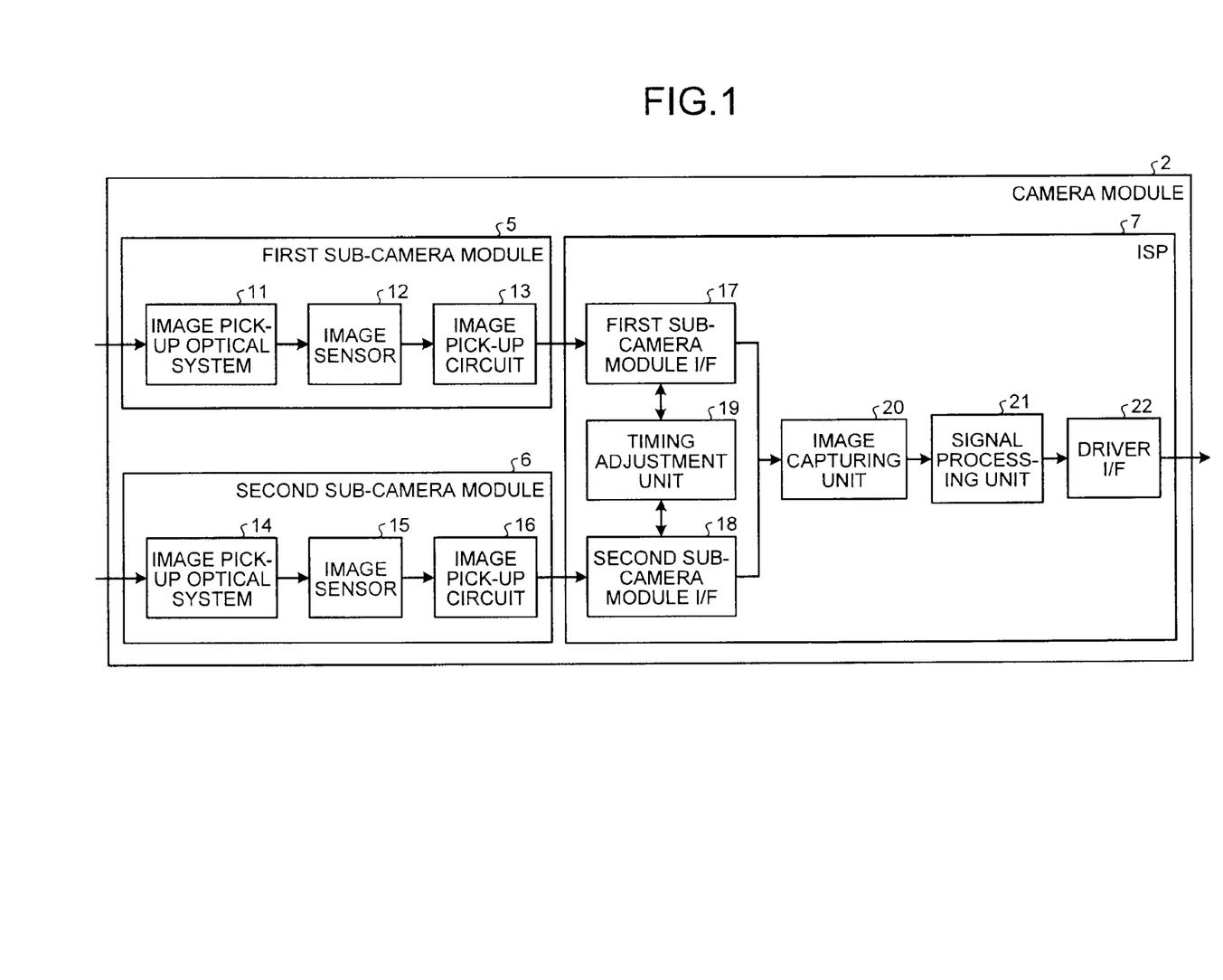
FIG. 1 is a block diagram illustrating a schematic configuration of a camera module according to a first embodiment.
Figure 2:
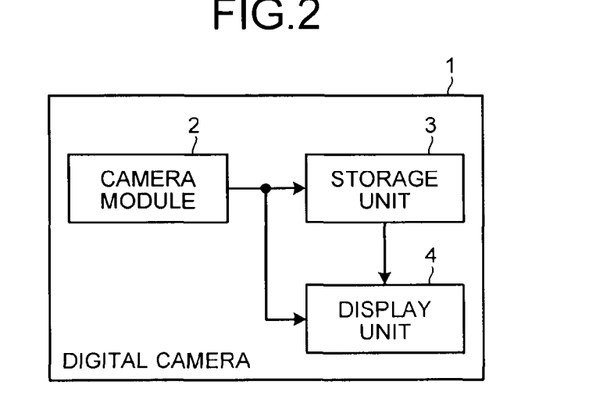
FIG. 2 is a block diagram illustrating a configuration of a digital camera which is electronic equipment having the camera module illustrated in FIG. 1.

FIG. 1 is a block diagram illustrating a schematic configuration of a camera module according to a first embodiment. FIG. 2 is a block diagram illustrating a configuration of a digital camera which is electronic equipment having the camera module illustrated in FIG. 1.

The digital camera 1 has a camera module 2, a storage unit 3, and a display unit 4. The camera module 2 picks up a photographic subject image. The storage unit 3 stores an image picked up by the camera module 2. The display unit 4 displays the image picked up by the camera module 2. The display unit 4 is, for example, a liquid crystal display.

The camera module 2 outputs an image signal to the storage unit 3 and the display unit 4 by picking up the photographic subject image. The storage unit 3 outputs the image signal to the display unit 4 in response to the operation and the like of a user. The display unit 4 displays an image in response to the image signal input from the camera module 2 or the storage unit 3. The camera module 2 may be a camera module applied to electronic equipment other than the digital camera 1, for example, a mobile phone with a camera, and the like.

The camera module 2 has a first sub-camera module 5, a second sub-camera module 6, and an image signal processor (ISP) 7. The first sub-camera module 5 picks up a first image, for example, a left eye image. The second sub-camera module 6 picks up a second image, for example, a right eye image.

The ISP 7 functions as an image processing apparatus. The ISP 7 executes an image processing as to the first image picked up by the first sub-camera module 5 and the second image picked up by the second sub-camera module 6.

The first sub-camera module 5 has an image pick-up optical system 11, an image sensor 12, and an image pick-up circuit 13. The image pick-up optical system 11 captures the light from a photographic subject to the image sensor 12. The image pick-up optical system 11 images the photographic subject image by the image sensor 12. The image sensor 12 converts the light captured by the image pick-up optical system 11 to a signal charge. The image sensor 12 functions as an image pick-up unit for picking up the photographic subject image.

The image pick-up circuit 13 drives the image sensor 12. Further, the image pick-up circuit 13 executes the processing of the image signal from the image sensor 12. The image pick-up circuit 13 generates analog image signals by capturing R (red), G (green), and B (blue) signal values in an order corresponding to a Bayer arrangement. The image pick-up circuit 13 converts the obtained image signals from an analog system to a digital system.

The second sub-camera module 6 has an image pick-up optical system 14, an image sensor 15, and an image pick-up circuit 16. The image pick-up optical system 14 captures the light from the photographic subject to the image sensor 15. The image pick-up optical system 14 images the photographic subject image by the image sensor 15. The image sensor 15 converts the light captured by the image pick-up optical system 14 to a signal charge. The image sensor 15 functions as an image pick-up unit for picking up the photographic subject image.

The image pick-up circuit 16 drives the image sensor 15. Further, the image pick-up circuit 16 executes the processing of the image signal from the image sensor 15. The image pick-up circuit 16 generates analog image signals by capturing R (red), G (green), and B (blue) signal values in an order corresponding to a Bayer arrangement. The image pick-up circuit 16 converts the obtained image signals from the analog system to the digital system.

The ISP 7 has a first sub-camera module I/F (interface) 17, a second sub-camera module I/F (interface) 18, a timing adjustment unit 19, an image capturing unit 20, a signal processing unit 21, and a driver I/F (interface) 22.

The first sub-camera module I/F 17 receives the input of the first image from the first sub-camera module 5. The second sub-camera module I/F 18 receives the input of the second image from the second sub-camera module 6. The first sub-camera module I/F 17 and the second sub-camera module I/F 18 employ a transmission system by, for example, a LVDS (low voltage differential signaling). The image capturing unit 20 captures the first image input to the first sub-camera module I/F 17 and the second image input to the second sub-camera module I/F 18.

The timing adjustment unit 19 adjusts the frame timing of the first image and the frame timing of the second image captured to the image capturing unit 20. The signal processing unit 21 executes a signal processing as to the first image and the second image captured to the image capturing unit 20. The driver I/F 22 outputs the image signal which has been subjected to a signal processing by the signal processing unit 21 to a not-illustrated display driver. The display driver displays the image picked up by the camera module 2.

Figure 3:
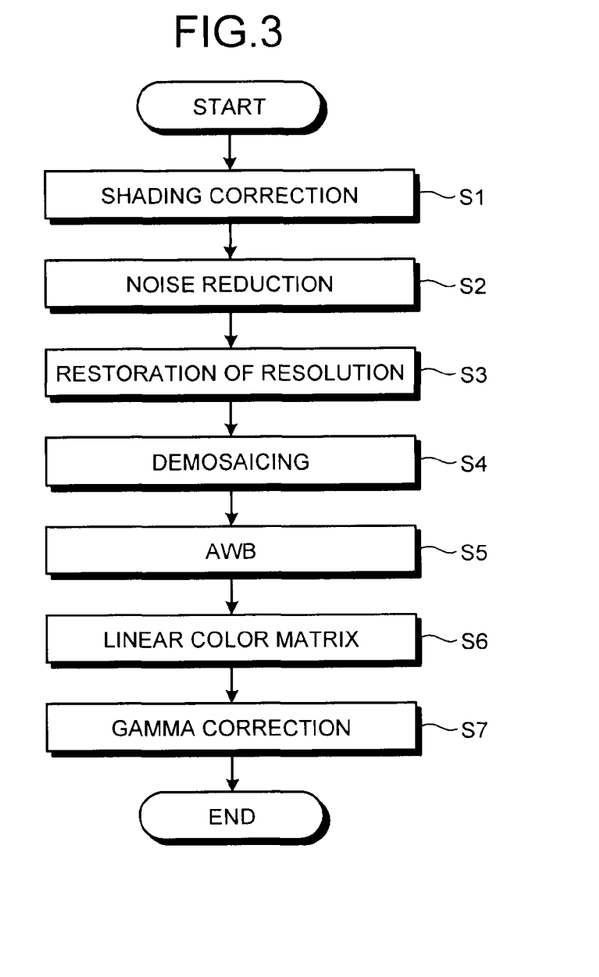
FIG. 3 is a flowchart explaining a procedure of a signal processing by a signal processing unit of an ISP.

FIG. 3 is a flowchart explaining a procedure of a signal process by a signal processing unit of the ISP. The signal processing unit 21 (refer to FIG. 1) executes a shading correction as to the first image and the second image (step S1). The signal processing unit 21 corrects luminance irregularity due to a difference between light amounts of the central sections and the peripheral sections of the image pick-up optical systems 11, 14 (refer to FIG. 1) by the shading correction.

The signal processing unit 21 executes a noise reduction (step S2) for removing noise such as fixed pattern noise, dark current noise, shot noise, and the like and a resolution restoration processing (step S3). Next, the signal processing unit 21 applies a pixels interpolate processing (demosaicing) to the digital image signals transmitted in the order of the Bayer arrangement (step S4). The demosaicing generates the sensitivity level value of an insufficient color component by the interpolate processing of the image signal obtained by picking up an image. The signal processing unit 21 synthesizes a color bit map image by the demosaicing.

The signal processing unit 21 executes an automatic white balance control (AWB) to a color image (step S5). Further, the signal processing unit 21 executes a linear color matrix processing for obtaining color reproducibility (step S6) and a gamma correction for correcting the saturation and the brightness of an image displayed on a display and the like (step S7). Note that the procedure of the signal processing in the ISP 7 explained in the embodiment is a mere example, and other processing may be appropriately added, a processing which can be omitted may be appropriately omitted, and the order of the processings may be appropriately changed.

A display drive may be a display drive for displaying a 3D (three-dimensionally viewed) image by any display system in response to the image signals transmitted from the camera module 2.

Figure 4:
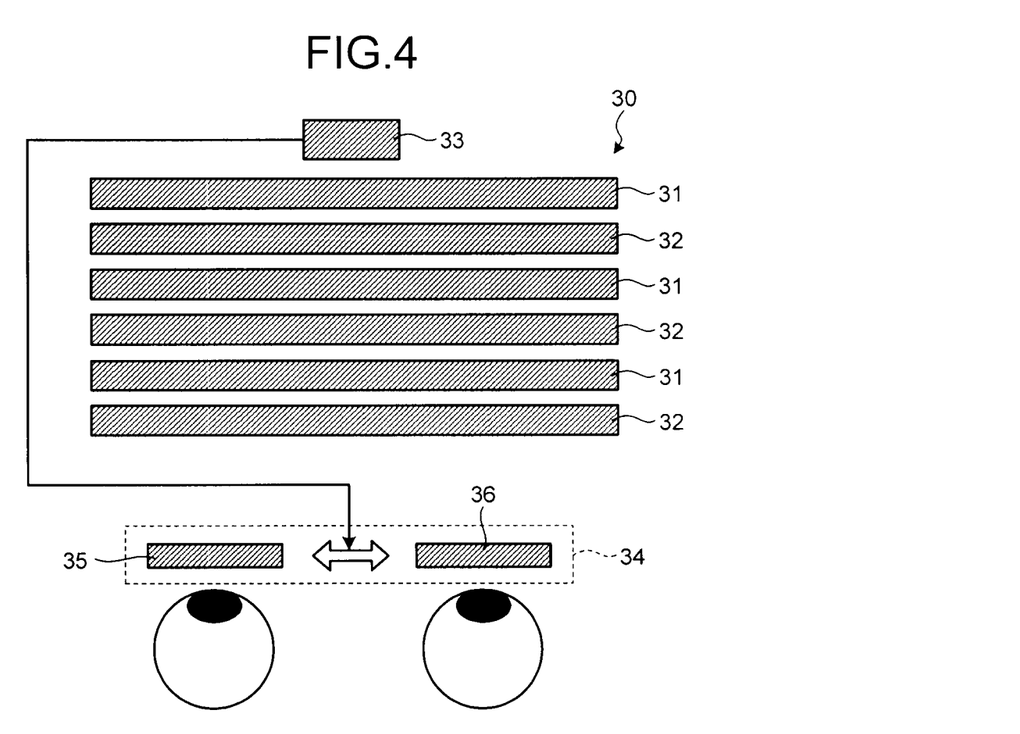
FIG. 4 is a view explaining a display of a 3D (three-dimensionally viewed) image employing an active shutter system.

FIG. 4 is a view explaining a display of a 3D (three-dimensionally viewed) image employing an active shutter system. When the active shutter system is employed, the display drive 30 displays a first image 31 for a left eye and a second image 32 for a right eye by switching the images at a high speed. The display drive 30 displays, for example, the first image 31 and the second image 32 alternately in each line in a horizontal direction.

Glasses 34 used by a viewer have a left eye liquid crystal shutter 35 and a right eye liquid crystal shutter 36. An infrared ray synchronization emitter 33 of the display drive 30 transmits an infrared ray signal in synchronization with the switching of the display of the first image 31 and the display of the second image 32 in the display drive 30. The glasses 34 sequentially switch the transmission and the shield of the light in the left eye liquid crystal shutter 35 and the right eye liquid crystal shutter 36 in response to the infrared ray signal from the infrared ray synchronization emitter 33.

The left eye liquid crystal shutter 35 causes the light to pass therethrough as well as the right eye liquid crystal shutter 36 shields the light, in synchronization with the display of the first image 31 in the display drive 30. With the operation, the viewer observes the first image 31 by the left eye. Further, the left eye liquid crystal shutter 35 shields the light as well as the right eye liquid crystal shutter 36 causes the light to pass therethrough, in synchronization with the display of the second image 32 in the display drive 30. With the operation, the viewer observes the second image 32 by the right eye. The viewer can obtain three-dimensional feeling by the parallax between the first image 31 and the second image 32.

Figure 5:
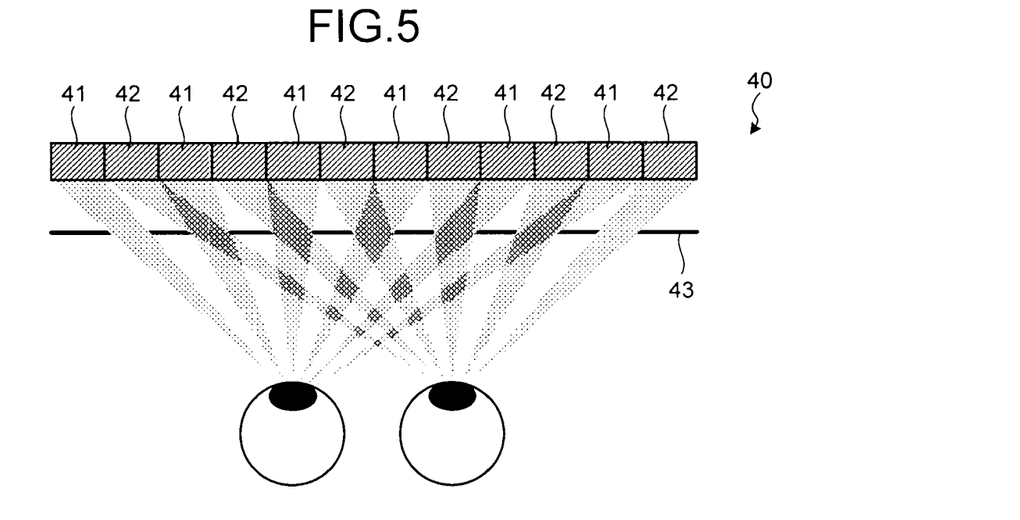
FIG. 5 is a view explaining a display of a 3D (three-dimensionally viewed) image employing a parallax barrier system.

FIG. 5 is a view explaining a display of a 3D (three-dimensionally viewed) image employing a parallax barrier system. When the parallax barrier system is employed, a parallax barrier 43 for controlling a light traveling direction is disposed to the viewer side with respect to the display drive 40. The display drive 40 alternately displays the first image 41 and the second image 42 in, for example, each vertical column.

The parallax barrier 43 causes the light toward the left eye from the column for displaying the first image 41 in display drive 40 to pass therethrough as well as shields the light toward the left eye from the column for displaying the second image 42. Further, the parallax barrier 43 shields the light toward the right eye from the column for displaying the first image 41 in display drive 40 as well as causes the light toward the right eye from the column for displaying the second image 42 to pass therethrough. The viewer observes the first image 41 by the left eye and observes the second image 42 by the right eye. The viewer can obtain three-dimensional feeling by the parallax between the first image 41 and the second image 42.

Figure 6:
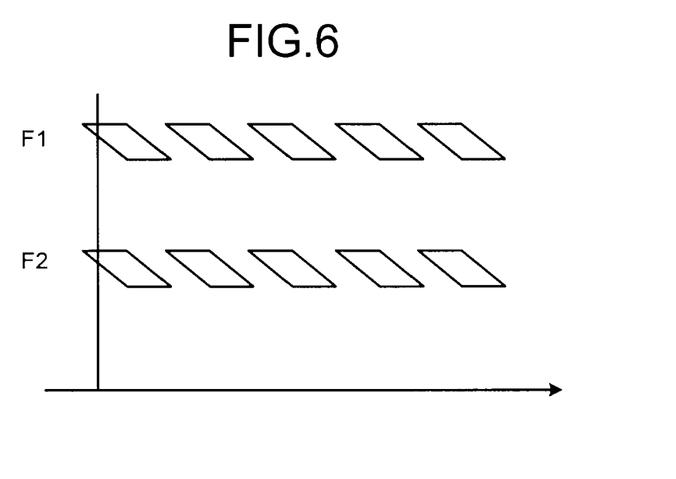
FIG. 6 is a view explaining an adjustment for causing the frame timing of a first image to agree with the frame timing of a second image.
Figure 7:
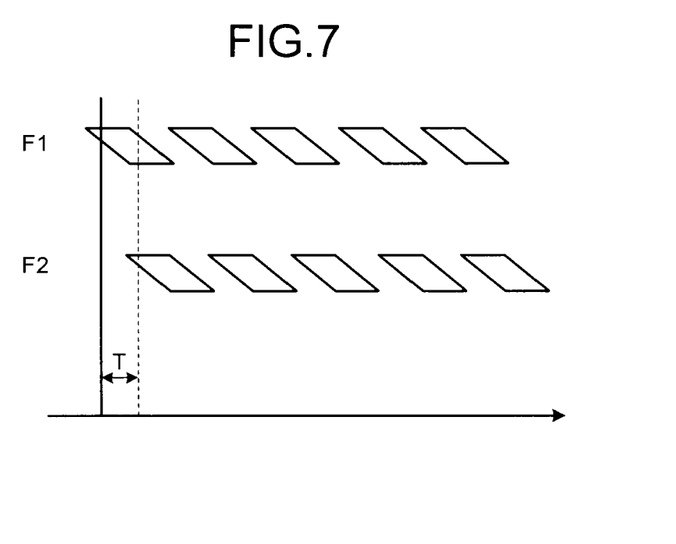
FIG. 7 is a view explaining an adjustment for delaying the frame timing of the second image to the frame timing of the first image.

FIG. 6 and FIG. 7 are views explaining adjustments of the frame timings of the first image and the second image by the timing adjustment unit. The timing adjustment unit 19 can make it possible to switch the adjustment for causing the frame timing F1 of the first image to agree with the frame timing F2 of the second image as illustrated in FIG. 6 and the adjustment for delaying the frame timing F2 of the second image to the frame timing F1 of the first image as illustrated in FIG. 7.

Which is applied, the adjustment for causing the frame timing F2 to agree with the frame timing F1 or the adjustment for delaying the frame timing F2 from the frame timing F1, is selected by, for example, the user. The camera module 2 may be provided with a switch, a GUI (graphical user interface), and the like for receiving an operation for switching the timing adjustment in the timing adjustment unit 19.

The camera module 2 captures the frame of the second image at an intermediate timing between the frames of the first images. A period T during which the frame timing F2 of the second image is delayed to the frame timing F1 of the first image is set to, for example, a half frame period corresponding to a half of one frame period. The timing adjustment unit 19 delays the frame timing F2 of the second image for the half frame period to the frame timing F1 of the first image.

When it is assumed, for example, that the first sub-camera module 5 and the second sub-camera module 6 obtain photographic subject images at 60 Hz, respectively, the camera module 2 sequentially captures the images at a timing corresponding to approximately 120 Hz by alternately capturing the first image and the second image. With the operation, the camera module 2 can obtain an image which has a relatively smooth action and whose unnaturalness is suppressed even if the image has the same frame rate as that of an ordinary plan-viewed image.

Note that it is sufficient that the period T during which the frame timing F2 of the second image is delayed to the frame timing F1 of the first image is a period shorter than at least one frame period, and the period T is not limited to the case that it is set to the half frame period.

Figure 8:
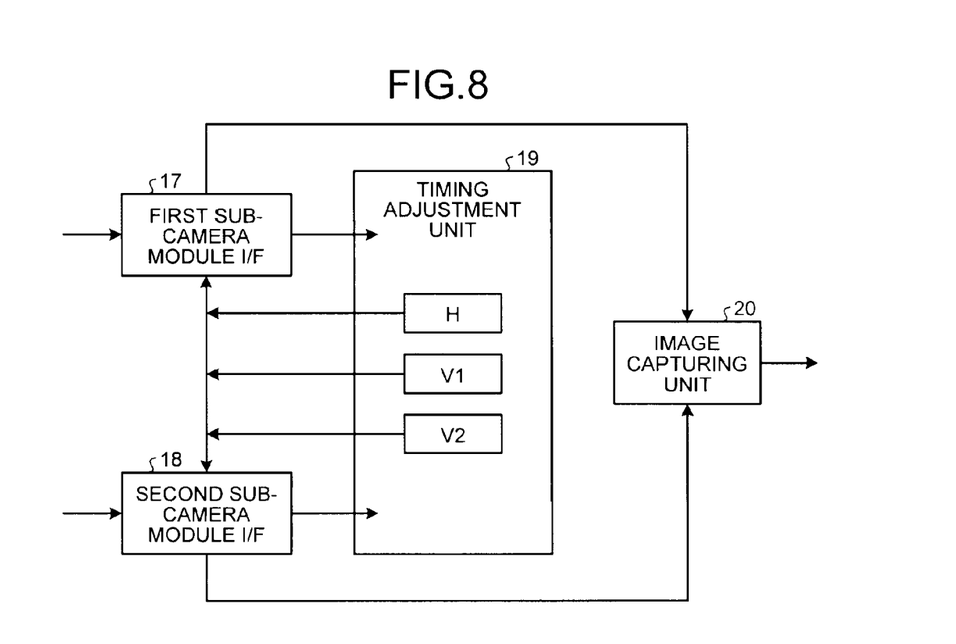
FIG. 8 is a block diagram explaining an adjustment of frame timing by a timing adjustment unit.

FIG. 8 is a block diagram explaining an adjustment of frame timing by the timing adjustment unit. The timing adjustment unit 19 generates a horizontal synchronization signal H and vertical synchronization signals V1, V2. The vertical synchronization signal V2 is generated so as to show a timing delayed by the period T to the vertical synchronization signal V1.

Figure 9:
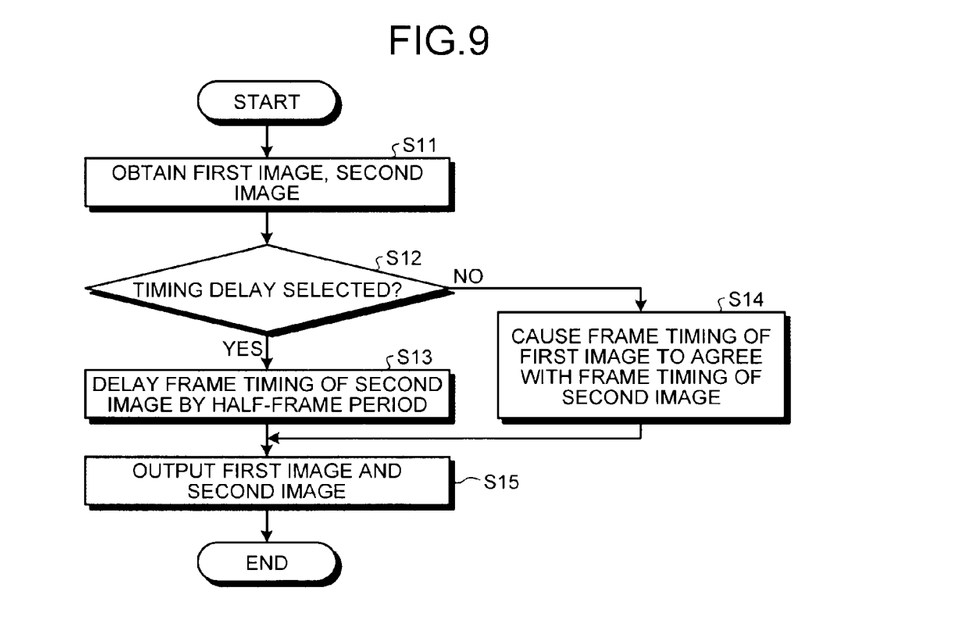
FIG. 9 is a flowchart illustrating a procedure for adjusting frame timing by the timing adjustment unit.

FIG. 9 is a flowchart illustrating a procedure for adjusting frame timing by the timing adjustment unit. At step S11, the first sub-camera module 5 obtains the first image. The second sub-camera module 6 obtains the second image. The first sub-camera module 5 outputs the obtained first image to the first sub-camera module I/F 17. The second sub-camera module 6 outputs the obtained second image to the second sub-camera module I/F 18.

At step S12, the timing adjustment unit 19 determines whether or not the adjustment for delaying the frame timing F2 by the period T to the frame timing F1 is selected. When the adjustment for delaying the frame timing F2 to the frame timing F1 is selected (step S12, Yes), the timing adjustment unit 19 executes the adjustment for delaying the frame timing F2 by the period T which is the half frame period (step S13).

The timing adjustment unit 19 applies the horizontal synchronization signal H and the vertical synchronization signal V1 to the first image input to the first sub-camera module I/F 17. Further, the timing adjustment unit 19 applies the horizontal synchronization signal H and the vertical synchronization signal V2 to the second image input to the second sub-camera module I/F 18.

When the adjustment for delaying the frame timing F2 to the frame timing F1 is not selected (step S12, No), the timing adjustment unit 19 executes the adjustment for causing the frame timing F2 to agree with the frame timing F1 (step S14). The timing adjustment unit 19 applies the horizontal synchronization signal H and the vertical synchronization signal V1 to both the first image input to the first sub-camera module I/F 17 and the second image input to the second sub-camera module I/F 18. As described above, the timing adjustment unit 19 makes it possible to change the vertical synchronization signal applied to the second image input to the second sub-camera module I/F 18 in response to the selection of the timing adjustment.

The image capturing unit 20 captures the first image whose frame timing F1 has been adjusted by the timing adjustment unit 19 from the first sub-camera module I/F 17. Further, the image capturing unit 20 captures the second image whose frame timing F2 has been adjusted by the timing adjustment unit 19 from the second sub-camera module I/F 18. The ISP 7 outputs the image signal, which has been captured to the image capturing unit 20 and then subjected to the signal processing by the signal processing unit 21, from the driver I/F 22 (step S15).

As described above, the camera module 2 can obtain the image which has the relatively smooth action and whose unnaturalness is suppressed even if the image has the same frame rate as that of the ordinary plan-viewed image by applying the adjustment of the frame timings F1, F2 by the timing adjustment unit 19. Note that the camera module 2 may adjust the frame timings F1, F2 by, for example, the control of electronic shutters (ES) in the first sub-camera module 5 and the second sub-camera module 6 in addition to that the camera module 2 adjusts the frame timings F1, F2 by changing the vertical synchronization signal.

The selection whether or not the timing adjustment unit 19 executes the timing adjustment for delaying the frame timing F2 is not limited to the case that the selection is made by the user. The timing adjustment unit 19 may switch setting of the timing adjustment in response to, for example, an image signal input to the ISP 7. When, for example, an image signal for displaying a three-dimensionally viewed image is input to the ISP 7, the timing adjustment unit 19 executes the adjustment for delaying the frame timing F2 from the frame timing F1. Further, when an image signal for displaying a plan-viewed image is input to the ISP 7, the timing adjustment unit 19 executes the adjustment for causing the frame timing F2 to agree with the frame timing F1.

Figure 10:
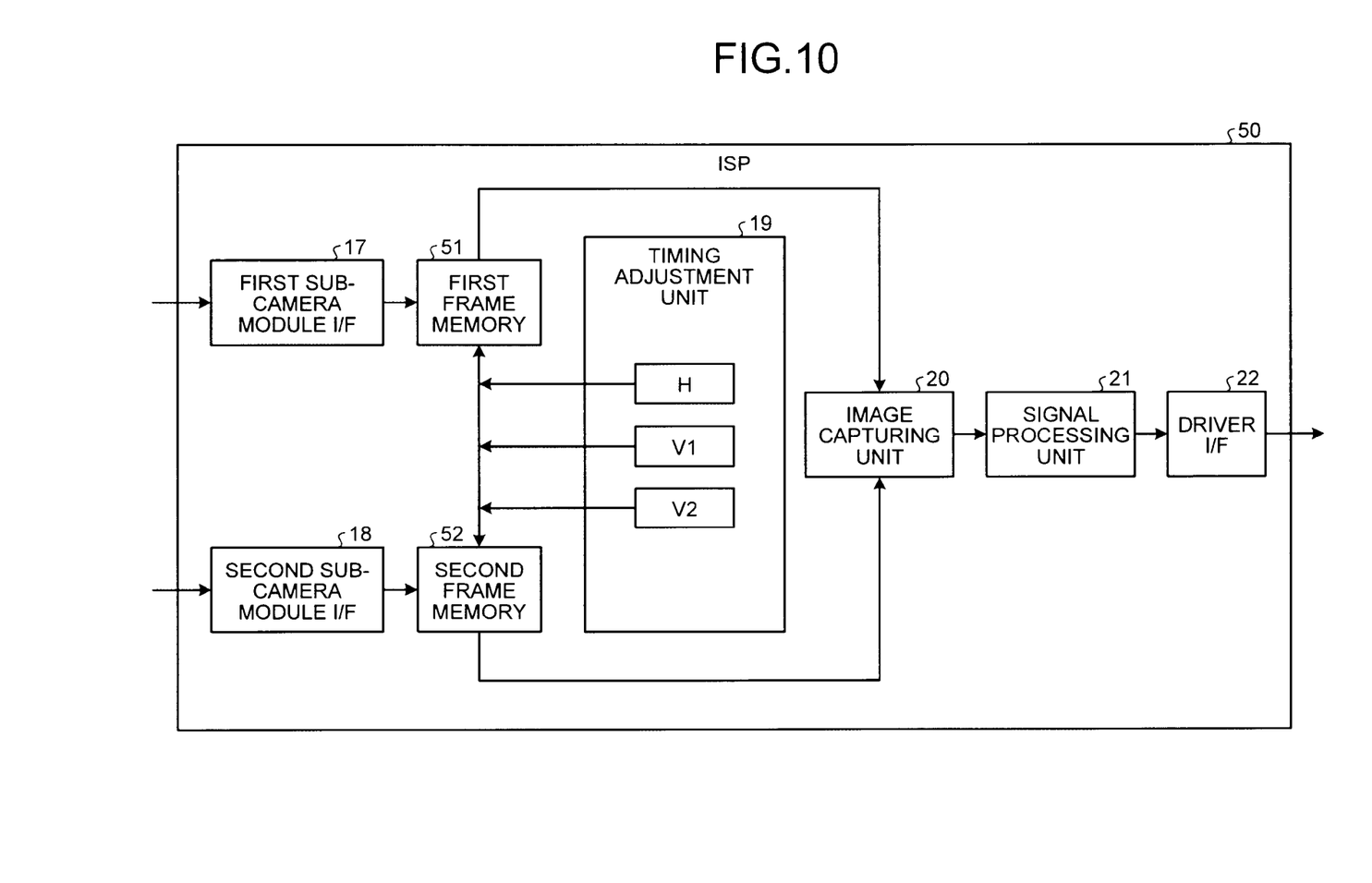
FIG. 10 is a block diagram illustrating a configuration of an ISP which is an image processing apparatus according to a second embodiment.

FIG. 10 is a block diagram illustrating a configuration of an ISP which is an image processing apparatus according to a second embodiment. The same sections as those of the first embodiment are denoted by the same reference numerals and an overlapping explanation is omitted.

An ISP 50 has a first frame memory 51 and a second frame memory 52 in addition to the respective configurations disposed to the ISP 7 of the first embodiment (refer to FIG. 1).

The first frame memory 51 temporarily stores a first image input to a first sub-camera module I/F 17. The second frame memory 52 temporarily stores a second image input to a second sub-camera module I/F 18.

When an adjustment for delaying a frame timing F2 to a frame timing F1 is selected, a timing adjustment unit 19 applies a horizontal synchronization signal H and a vertical synchronization signal V1 to the first image stored in the first frame memory 51. Further, the timing adjustment unit 19 applies the horizontal synchronization signal H and a vertical synchronization signal V2 to the second image stored in the second frame memory 52.

When the selection for causing the frame timing F2 to agree with the frame timing F1 is selected, the timing adjustment unit 19 applies the horizontal synchronization signal H and the vertical synchronization signal V1 to both the first image stored in the first frame memory 51 and the second image stored in the second frame memory 52. As described above, the timing adjustment unit 19 makes it possible to change the vertical synchronization signal applied to the second image stored in the second frame memory 52 in response to the selection of the timing adjustment.

An image capturing unit 20 captures the first image whose frame timing F1 has been adjusted by the timing adjustment unit 19 from the first frame memory 51. Further, the image capturing unit 20 captures the second image whose frame timing F2 has been adjusted by the timing adjustment unit 19 from the second frame memory 52.

Also in the embodiment, a camera module 2 can obtain an image which has a relatively smooth action and whose unnaturalness is suppressed even if the image has the same frame rate as that of an ordinary plan-viewed image by applying the adjustment of the frame timings F1, F2 by the timing adjustment unit 19. The camera module 2 according to the first and second embodiments may be applied to electronic equipment other than the digital camera 1, for example, a mobile phone with a camera and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera system comprising:
    a first sub-camera configured to pick up a first image;
    a second sub-camera configured to pick up a second image; and
    an image signal processor configured to execute image processing as to the first image picked up by the first sub-camera and the second image picked up by the second sub-camera,
    wherein:
    the image signal processor is configured to
    capture the first image input from the first sub-camera and the second image input from the second sub-camera,
    adjust a frame timing of the first image and a frame timing of the second image,
    capture the first image input from the first sub-camera at a frame timing depending on a vertical synchronization signal,
    capture the second image input from the second sub-camera at a frame timing delayed for a period shorter than one frame period to the frame timing of the first image,
    output the first image and the second image at double a frequency at which each of the first sub-camera picks up the first image and the second sub-camera picks up the second image, and
    switch from an adjustment for delaying the frame timing of the second image to the frame timing of the first image to an adjustment for causing the frame timing of the first image to be consistent with the frame timing of the second image,
    when an image signal for displaying a three-dimensionally viewed image is input to the image signal processor, the image signal processor executes the adjustment for delaying the frame timing of the second image from the frame timing of the first image, and
    when an image signal for displaying a plan-viewed image is input to the image signal processor, the image signal processor executes the adjustment for causing the frame timing of the second image to agree with the frame timing of the first image.

2. The camera system according to claim 1, wherein the image signal processor is further configured to generate a vertical synchronization signal to be applied to the first image and a vertical synchronization signal to be applied to the second image, and
    wherein the vertical synchronization signal applied to the second image is delayed for a period shorter than one frame period to the vertical synchronization signal applied to the first image.

3. The camera system according to claim 1, wherein the image signal processor is further configured to delay the frame timing of the second image for a period corresponding to a half of one frame period to the frame timing of the first image.

* * * * *